(12) United States Patent
Matsui et al.

(10) Patent No.: US 8,056,903 B2
(45) Date of Patent: Nov. 15, 2011

(54) ROD SEALING SYSTEM

(75) Inventors: Noriyuki Matsui, Fukushima (JP);
Manabu Hirano, Fukushima (JP);
Yoshihiro Kuzumaki, Kanagawa (JP);
Kuniyoshi Saito, Ibaraki (JP); Hayato Takada, Ibaraki (JP)

(73) Assignees: NOK Corporation, Tokyo (JP);
Unimatec Co. Ltd., Tokyo (JP)

( * ) Notice: Subject to any disclaimer, the term of this patent is extended or adjusted under 35 U.S.C. 154(b) by 757 days.

(21) Appl. No.: 12/086,211

(22) PCT Filed: Dec. 5, 2006

(86) PCT No.: PCT/JP2006/324201
§ 371 (c)(1),
(2), (4) Date: Jun. 6, 2008

(87) PCT Pub. No.: WO2007/066630
PCT Pub. Date: Jun. 14, 2007

(65) Prior Publication Data
US 2009/0166984 A1    Jul. 2, 2009

(30) Foreign Application Priority Data

Dec. 6, 2005 (JP) ................................. 2005-351810

(51) Int. Cl.
*F16J 15/16* (2006.01)

(52) U.S. Cl. ......... 277/534; 277/530; 277/439; 277/567

(58) Field of Classification Search .................. 277/567, 277/530, 439, 462, 534, 540
See application file for complete search history.

(56) References Cited

U.S. PATENT DOCUMENTS

| | | | | |
|---|---|---|---|---|
| 3,195,901 A | * | 7/1965 | Mercier | 277/438 |
| 3,738,665 A | * | 6/1973 | Bilco | 277/558 |
| 4,284,280 A | * | 8/1981 | Bertram et al. | 277/558 |
| 4,867,460 A | * | 9/1989 | Colo et al. | 277/556 |
| 5,066,762 A | * | 11/1991 | Ohbuchi et al. | 528/85 |
| 5,088,745 A | * | 2/1992 | Peppiatt et al. | 277/579 |
| 5,100,999 A | * | 3/1992 | Murai et al. | 528/76 |
| 5,303,934 A | * | 4/1994 | Elliott | 277/346 |
| 6,113,108 A | * | 9/2000 | Friend et al. | 277/549 |

(Continued)

FOREIGN PATENT DOCUMENTS

JP    01-095119    4/1989

(Continued)

*Primary Examiner* — Alison Pickard
(74) *Attorney, Agent, or Firm* — Brinks Hofer Gilson & Lione

(57) ABSTRACT

In a rod sealing system, which comprises a buffer ring, a rod seal, and a dust seal, provided successively in this order from a fluid hydraulic side toward the outside in an annular clearance between two members in reciprocating motion, the buffer ring is made up of a thermoplastic polyurethane molding product obtained by subjecting a thermoplastic polyurethane molding product prepared by reaction of (A) a high molecular weight polycarbonatediol having a number average molecular weight Mn of 500-6,000, (B) an aromatic diisocyanate, and (C) a low molecular weight diol as a chain elongation agent in an NCO/OH ratio of 0.95-1.20, to heat treatment under conditions that a glass transition point (Tg) of hard phases becomes 170° C. or higher, preferably 170-230° C., and an endothermic peak area (ΔH) at Tg becomes 5 J/g or more, by differential scanning calorimetry. The buffer ring made up of the thermoplastic polyurethane molding product has a distinguished heat resistance capable of withstanding the service environmental temperature, particularly maximum 120° C., compression set characteristics, follow-up to eccentricity, etc.

5 Claims, 1 Drawing Sheet

U.S. PATENT DOCUMENTS

| | | | |
|---|---|---|---|
| 6,538,075 B1 * | 3/2003 | Krech et al. | 525/458 |
| 6,609,716 B2 * | 8/2003 | Friend et al. | 277/550 |
| 7,083,170 B2 * | 8/2006 | Borstel et al. | 277/589 |
| 7,476,484 B2 * | 1/2009 | Sailer et al. | 430/270.1 |
| 2009/0166984 A1 * | 7/2009 | Matsui et al. | 277/562 |

FOREIGN PATENT DOCUMENTS

| | | |
|---|---|---|
| JP | 02-269113 | 11/1990 |
| JP | 04-211033 | 8/1992 |
| JP | 04-332716 | 11/1992 |
| JP | 06-116354 | 4/1994 |
| JP | 06-288477 | 10/1994 |
| JP | 07-228661 | 8/1995 |
| JP | 2000-009106 | 1/2000 |
| JP | 2001-355739 | 12/2001 |

* cited by examiner

[Fig.1]
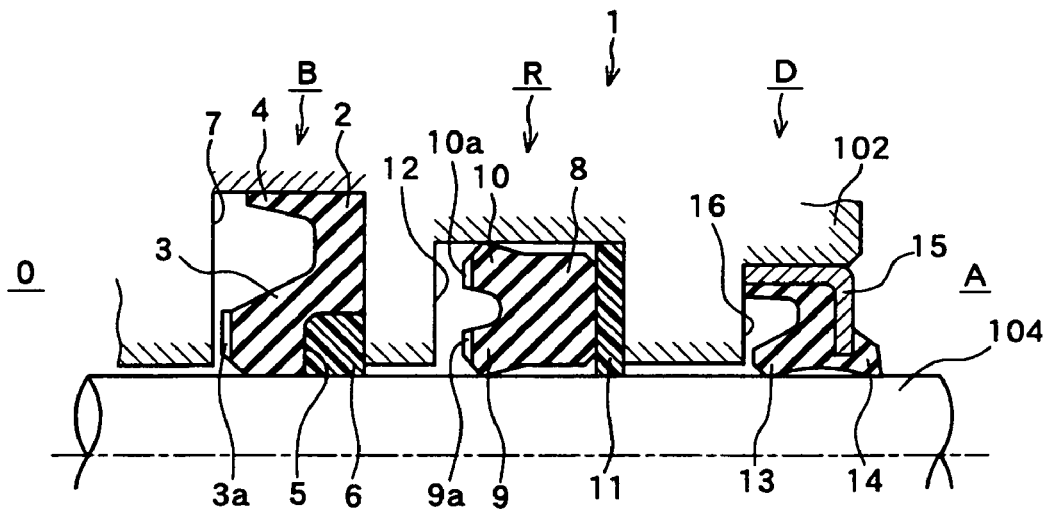
[Fig.2]
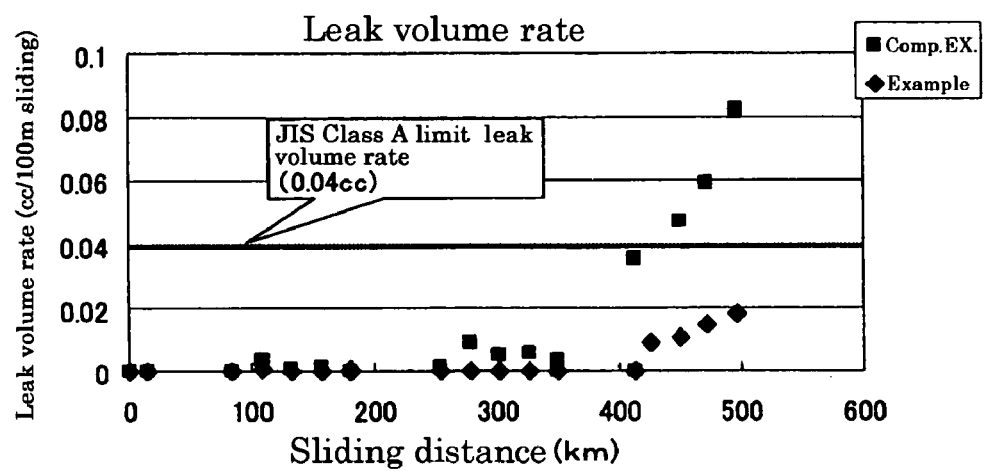

ROD SEALING SYSTEM

RELATED APPLICATIONS

The present application is a 35 U.S.C. §371 national stage filing of International Patent Application No. PCT/JP2006/324201, filed Dec. 12, 2006, to which priority is claimed under 35 U.S.C. §120 and through which priority is claimed under 35 U.S.C. §119 to Japanese Priority Patent Application No. 2005-351810, filed Dec. 2, 2005.

TECHNICAL FIELD

The present invention relates to a rod sealing system, and more particularly to a rod sealing system, which comprises a buffer ring, a rod seal, and a dust seal, provided successively in this order from a hydraulic fluid side toward the outside in an annular clearance between two members in reciprocating motion.

BACKGROUND ART

A rod sealing system, which comprises a buffer ring, a rod seal, and a dust seal, provided successively in this order from a hydraulic fluid side toward the outside in an annular clearance between two members in reciprocating motion is disclosed in the following Patent Literature 1, and shown in FIG. 1 as a half-cutaway cross-sectional view, where a rod sealing system 1 comprises a rod seal R as the main seal for preventing leakage of a working oil to the outside, a buffer ring B provided on the oil hydraulic side O of the rod seal R to buffer the impact pressure or pressure fluctuations at a high-load stages, or to shut off the inflow of high-temperature working oil into the rod seal R, thereby improving the durability of rod seal R, and a dust seal D for preventing inflow of external muddy water or dusts into the rod seal R at the outside A, as provided in an arrangement in the order of B-R-D from the hydraulic fluid side toward the outside in an annular clearance between two members in reciprocating motion, for example, a rod and a cylinder.

Patent Literature 1: JP-A-2001-355739

To make the longer service life of such a rod seal ring system, specific materials are selected for each seal type of rod seal R, buffer ring B, and dust seal D from the viewpoints of material characteristics such as heat resistance, oil resistance, abrasion resistance, etc. Above all, the buffer ring B is provided on the nearest side to hydraulic oil, and exposed to a high-pressure, high-temperature oil, and thus materials with distinguished strength and heat resistance must be selected for use.

To meet the recent need for higher pressure (35 MPa 42 MPa) and higher temperature (maximum 110° C.), and furthermore longer service life, the afore-mentioned Patent Literature 1 discloses selection of a lip seal type for buffer ring B and use of heat-resistant type polyurethane (polyurethane obtained from heat-resistant type polyol and heat-resistant type polyisocyanate) having distinguished heat resistance and abrasion resistance as the materials. As to rod seal R, it is disclosed to use a lip type and NBR or hydrogenated NBR having distinguished heat resistance, cold resistance, oil resistance, and follow-up to eccentricity as the materials. As to dust seal D, it is disclosed to use a split groove type lip seal with a ring bonded to the outer periphery, and general-purpose polyurethane as the materials from the viewpoint of cold resistance.

In the service temperature up to maximum 110° C., the service life of buffer ring B can be thereby prolonged to attain a load control effect on rod seal R, and thus the prolonged service life of rod sealing system can be obtained. Nowadays, however, there are needs for higher service temperatures up to maximum 120° C. or requirements for further improvement of system service life. When the rod sealing system of the afore-mentioned Patent Literature 1 is used, for example, at a service temperature of 120° C., such a problem as considerable decrease in the sealability has been encountered.

Shapes of members of the rod sealing system will be explained below, referring to FIG. 1. Buffer ring B can be used generally by fitting a backup ring 6 to the inner peripheral seal working as a heel of the sliding side of U-shaped packing 2. Rod seal R can be used generally by providing with a flat washer-type backup ring 11 adjacently to the outward side A of U-shaped packing 8. Dust seal D is fitted to a mounting groove 16 on the inner periphery of cylinder 102, where both of oil lip 13 provided on the oil hydraulic side O and dust lip 14 provided on the outward side A are allowed to slide along rod 104, and a metallic ring 15 is stoving fitted to the outer peripheral engaging part mounting the fitting groove 16.

Numeral 3 shows an inner peripheral lip, 3a a tip end recess thereof, 4 an outer peripheral lip, 5 an inner peripheral heel, 7 a mounting groove, 9 an inner peripheral lip, 9a a tip end recess thereof, 10 an outer peripheral lip, 10a a tip end recess thereof, and 12 a mounting groove, respectively.

Various causes of oil leakage can be presumed. In the sealing system, the rod seal is regarded as an important seal from the viewpoint of oil leakage, and thus the buffer ring is provided in front of the rod seal to buffer a pressure load impact onto the rod seal.

However, due to a loss of resilience caused by a decrease in mechanical strength or due to reduction in interference caused by an increase in abrasion, under conditions in excess of the service limit temperature or in continuous working under such conditions, buffer ring B will fail to function fully (see Paragraph [0022] of afore-mentioned Patent Literature 1). Thus, so long as the buffer ring can work without any damage, longer maintenance of interference will be more effective for pressure load-buffering on the rod seal for a long time. To satisfy the recent need for a higher service environmental temperature (120° C.) and also the need for longer service life, materials having distinguished heat resistance and mechanical characteristics are now required for buffer ring B.

However, the heat resistance and mechanical characteristics of thermoplastic polyurethane for use in the buffer ring B depend on physical restrictions imposed by hydrogen bonds, etc. of hard segments in the polymer chain, and thus have been so far not always satisfactory under the influence of softening or melting point, or heat stability of the hard segment. To improve the heat resistance, or compression set characteristics, it is known to increase the hard segment content. In that case, there is such a problem as an increase in the hardness of molding product resulting in loss of softness.

Attempts have been so far made to replace the components of the hard segment with more rigid ones to improve the heat resistance or compression set characteristics, but have been found not satisfactory. For example, Patent Literature 2 or 3 discloses use of 4,4'-biphenyldiol compounds having a molecule structure with good symmetry and rigidity, as a chain lengthening agent, where the resulting thermoplastic polyurethane has good mechanical characteristics, but suffers from a large reduction in the modulus of elasticity due to increased temperature, and also from an unsatisfactory heat resistance. When p-phenylene diisocyanate as disclosed in Patent Literature 4 is used as a diisocyanate compound, thermoplastic elastomers having distinguished thermal deformation resistance and compression set characteristics can be obtained, but the diisocyanate compound is hard to handle because of a high melting point and also sublimation property, so there is such a problem as thermoplastic elastomers of desired constant quality are hard to obtain.

Patent Literature 2: JP-A-4-211033
Patent Literature 3: JP-A-4-332716
Patent Literature 4: JP-A-1-95119

Thus, it is now difficult to satisfy the mechanical characteristics, heat resistance and compression set characters at the same time by changing the hard segment content or compression ratio of raw material polyurethane. It is known to solve these problems by adding a compounding component, i.e. by adding inorganic fibers such as glass fibers, carbon fibers, etc. or inorganic powder such as calcium carbonate, mica, talc, titanium oxide, whisker, etc. thereto as a reinforcing agent. To obtain a satisfactory effect, however, it is necessary to add a relatively large amount, for example, about 10 to about 30 parts by weight, or more, of the reinforcing agent to 100 parts by weight of thermoplastic polyurethane, sometimes giving rise to such problems as decreases in the rubber elasticity, rigidity, surface flatness, and increases in the specific gravity, etc., of the molding products On the other hand, Patent Literature 5 discloses another method not based on changes in component composition or compounding condition, that is, elimination of isocyanate groups NCO groups in a certain range (IR absorbance ratio of NCO group/C=C group is 0.10-0.35) remaining in the molding product just after hot molding by heat aging treatment, thereby increasing the cross-linking density to attain chemical stabilization and improve the compression set characteristics, etc. However, the heat resistance of thermoplastic polyurethane is largely dependent also on physical structure such a molecule arrangement (orderly arrangement of hard phases for improving the packing), besides the chemical structures such as cross-linking structure, and thus it is hard to obtain physical stabilities such compression set characteristics only by the method disclosed in Patent Literature 5.

Patent Literature 5: JP-A-7-228661

DISCLOSURE OF THE INVENTION

Problem to be Solved by the Invention

An object of the present invention is to provide a rod sealing system, which comprises a buffer ring, a rod seal, and a dust seal, provided successively in this order from a hydraulic fluid side toward the outside in an annular clearance between two members in reciprocating motion, where the buffer ring is made up of a thermoplastic polyurethane molding product having a distinguished heat resistance capable of withstanding a service environmental temperature, particularly maximum 120° C., and also having distinguished compression set characteristics, follow-up to eccentricity, etc.

Means for Solving the Problem

In above rod sealing system, the object of the present invention can be attained by making up the buffer ring of a thermoplastic polyurethane molding product obtained by subjecting a thermoplastic polyurethane molding product prepared by reaction of (A) a high-molecular weight polycarbonatediol having a number average molecular weight Mn of 500-6,000, (B) an aromatic diisocyanate, and (C) a low-molecular weight diol as a chain elongation agent in an NCO/OH ratio of 0.95-1.20 to a heat treatment under conditions that hard-phase glass transition point (Tg) becomes 170° C. or higher, preferably 1700-230° C., and an endothermic peak area (ΔH) at Tg becomes 5 J/g or more, by differential scanning calorimetry.

Effects of the Invention

In the structure of the present system, so long as the interference of buffer ring capable of attaining the pressure load-buffering effect on the rod seal, in the case of without any damage, etc., changes in the interference due to a loss of resilience are larger than changes in the interference due to abrasion, suggesting that the loss of resilience can be regarded as particularly important for the buffer ring in the rod sealing system.

In other words, the present thermoplastic polyurethane molding product has high heat resistance and compression set characteristics, particularly distinguished compression set characteristics at high temperatures such as 1000-120° C., and also has satisfactory follow-up to eccentricity, and thus can be used as a suitable sealing material or packing material.

When such a sealing material or packing material made of the thermoplastic polyurethane molding product is used as a buffer ring in a rod sealing system, that is, a rod sealing system comprising the buffer ring, a rod seal, and a dust seal, as used in oil hydraulic cylinders, etc. as actuators in construction machinery or transport vehicles, a durability against leakage due to a loss of resilience can be improved, thereby enhancing the heat-resistant limit temperature. Furthermore, the higher the temperature, or the longer the sliding distance, the more significantly the rate of loss of resilience or the compression set characteristics can be improved.

More specifically, use of such a heat-treated thermoplastic polyurethane molding product as a buffer ring can improve the durability against a loss of resilience due to a thermal factor, thereby maintaining the temperature- and pressure-reducing effect as a function of buffer ring, and it is expectable that suppression of a direct pressure load on the rod seal can attain reduction in surface pressure of rod seal, and also a heat generation-reducing effect. Thus, abrasion of rod seal can be suppressed, thereby increasing the service life of the rod sealing system. Furthermore, when the heat-treated thermoplastic polyurethane molding product is used as a buffer ring, such desired effects can be obtained, even if the rod seal is made of (hydrogenated) NBR, and the dust seal is made of general-purpose polyurethane.

BRIEF DESCRIPTION OF DRAWINGS

FIG. 1 a half-cutaway cross-sectional view of a rod sealing system.

FIG. 2 a diagram showing a relationship between sliding distance and leak volume rate in JIS Class A sliding durability test.

DESCRIPTION OF REFERENCE NUMERAL AND SYMBOL

| DESCRIPTION OF REFERENCE NUMERAL AND SYMBOL | |
|---|---|
| 1 | Rod sealing system |
| 2 | U-shaped packing |
| 3 | Inner peripheral lip |
| 4 | Outer peripheral lip |
| 5 | Inner peripheral heel |
| 6 | Backup ring |
| 7 | Fitting groove |

| | -continued |
|---|---|
| DESCRIPTION OF REFERENCE NUMERAL AND SYMBOL | |
| 8 | U-shaped packing |
| 9 | Inner peripheral lip |
| 10 | Outer peripheral lip |
| 11 | Backup ring |
| 12 | Fitting groove |
| 13 | Oil lip |
| 14 | Dust lip |
| 15 | Metallic ring |
| 16 | Fitting groove |
| 102 | Cylinder |
| O | Oil hydraulic side |
| A | Outside |
| B | Buffer ring |
| R | Rod seal |
| D | Dust seal |

BEST MODES FOR CARRYING OUT THE INVENTION

Thermoplastic polyurethane (polyurethane-based thermoplastic elastomer) molding product to be heat treated can be prepared by diisocyanate polyaddition reaction between a high molecular weight polycarbonate diol (long-chain glycol) having active hydrogen terminals and a low molecular weight diol (short-chain glycol) as a chain lengthening agent.

High molecular weight polycarbonate diol as Component (A) for use in the present invention is compounds having two or more carbonate structures in the molecule and a molecular weight of 500-6,000, preferably 1,000-3,000 including, for example, polycondensation products between diols such as 1,4-butanediol, 1,6-hexanediol, neopentyl glycol, 1,8-octanediol, 1,9-nonanediol, 1,4-cyclohexanedimethanol, 2-methylpropanediol, dipropylene glycol, diethylene glycol, etc., or reaction products of these diols with dicarboxylic acids such as oxalic acid, malonic acid, adipic acid, azelaic acid, hexahydrophthalic acid, etc., and aromatic carbonates or aliphatic carbonates such as diphenyl carbonate, bis(chlorophenyl) carbonate, dinaphthyl carbonate, phenyl toluoyl carbonate, phenyl chlorophenyl carbonate, 2-tolyl-4-tolyl carbonate, dimethyl carbonate, diethyl carbonate, diethylene carbonate, ethylene carbonate, etc.; compounds represented by the following general formula:

$HO(C_nH_{2n}OCOO)_mC_nH_{2n}OH;$ and compounds having the following general formula, obtained by transesterification between alkylene carbonate $(R'O)_2CO$ and alkylene glycol HOROH:

$HO(ROCOO)_nROH$

When the molecular weight is less than 500, no suitable rubber elasticity for buffer ring materials can be obtained, whereas when the molecular weight is above 6,000 no satisfactory rubber hardness can be obtained. The polyol component (A) can be used in a proportion of 30-90% by weight, preferably 40-70% by weight, on the basis of sum total of three components (A), (B) and (C). Below 30% by weight the moldability will be deteriorated, whereas above 90% by weight the heat resistance and the compression set characteristics will be deteriorated.

Aromatic diisocyanate for use in the present invention as component (B) includes, for example, toluene diisocyanate, tolidine diisocyanate, 4,4'-diphenylmethane diisocyanate (MDI), p-phenylene diisocyanate, naphthalene diisocyanate, polymeric MDI, etc. Tolidine diisocyanate is preferable from the viewpoints of handling and moldability.

Chain elongation agent (C) as another diol component for the reaction is other diols than polycarbonates. Diols having a molecular weight of about 50 to about 500, for example, one or more of glycols such as 1,4-butanediol, 1,6-hexanediol, 2,3-butanediol, 1,4-bis(β-hydroxyethoxy)benzene, p-xylylene glycol, glycerine monoallyl ether, dimethyloldihydropyran, etc. can be used in a proportion of 1-60% by weight, preferably 5-40% by weight, on the basis of sum total of three components (A), (B) and (C). Above 60% by weight the moldability will be deteriorated, whereas below 1% by weight the heat resistance and the compression set characteristics will be deteriorated.

Polyurethane forming reaction of these three components can be carried out in an NCO/OH ratio of 0.95-1.20, preferably 1.05-1.10, i.e. a ratio of NCO group of organic diisocyanate to OH group of high molecular weight diol and low molecular weight diol as a chain elongation agent. When the ratio is outside the afore-mentioned range, the molecular weight of the resulting polyurethane will be lowered, or side reactions due to the presence of excess isocyanate group or hydroxyl group will take place to lower the physical properties. During the reaction, a tin compound, an amine compound, etc. can be further added thereto as a catalyst, if required, and furthermore, a filler, a metal oxide, a metal hydroxide, a lubricant, etc. can be added thereto, if desired.

The three components are molded into desired shapes such as sheets, etc. by a one-shot process or a prepolymer process, using an injection molding machine, an extruder, etc., and then the resulting thermoplastic polyurethane molding products are subjected to heat treatment (physical aging). The heat treatment can be carried out in an inert gas atmosphere of nitrogen gas, etc. under conditions that the glass transition temperature (Tg) of hard phases of thermoplastic polyurethane becomes 170° C. or higher, preferably 1700-230° C., more preferably 175°-210° C., and the an enthalpy (ΔH) showing an endothermic peak area of Tg becomes 5 J/g or more, preferably 6 J/g or more, by differential scanning calorimetry at a temperature elevation rate of 10° C./min.

More specifically, the heat treatment can be carried out at a temperature between the glass transition temperature of soft phases and glass transition temperature (Tg) of hard phases, actually by appropriately controlling the temperature and the time to 135°-170° C. and about 10-100 hours, respectively, and the heat treatment atmosphere can be also selected, if required. The heat treatment for obtaining the glass transition characteristics depends on the respective components involved and their composition proportions, and can be generally carried out at 150° C. for 15 hours or more.

When the glass transition temperature (Tg) of hard phases is below 170° C., the heat resistance or the compression set characteristics will be deteriorated, whereas above 230° C., the thermoplastic polyurethane molding products will be thermally deteriorated. As to the enthalpy (ΔH) showing an endothermic peak area of Tg, the higher the ΔH value, the more preferable from the viewpoint of thermal stability of the materials, maximum about 18 J/g is available.

The soft phases in the thermoplastic polyurethane also have a glass transition point, which is in a lower temperature range than room temperature, and thus is irrelevant to the heat resistance. That is, only the glass transition characteristics of hard phases can dominate the kinematic property of polyurethane on the high-temperature side. Primary structure and secondary tertiary structures of hard phases can be regarded as dominant factors in the glass transition characteristics.

The behavior of primary structure of the hard phases is bring about a rigid structures of benzene ring, etc. brought into the molecule structure, thereby raising the glass transition point (Tg), that is, the aromatic diisocyanates are used as a diisocyanate compound. On the other hand, the secondary•tertiary structures are hard to control only by component composition, and thus a specific heat treatment is necessary to carry out to proceed the packing of hard phases, thereby shifting Tg toward a higher temperature side and raising the enthalpy (ΔH) value.

When the thermoplastic polyurethane molding products can have higher Tg and ΔH in the service environment, a larger amount of energy will be required for breaking the packing structure of hard phase for the afore-mentioned reasons, and thus the thermoplastic polyurethane molding products can have higher heat resistance and compression set characteristics, especially satisfactory compression set characteristics at high temperature such as 100°-120° C.

The afore-mentioned Patent Literature 5 discloses that thermoplastic polyurethane elastomers prepared by reaction of a high molecular weight diol, a diisocyanate compound, and 1,4-bis(β-hydroxyethoxy)benzene in an NCO/OH ratio of 1.07-1.15 are hot molded, and the resulting molding products are subjected to heat aging at 90°-130° C., preferably 1050-120° C., but no such Tg and ΔH values defined as in the present invention can be obtained under the disclosed heat aging conditions.

When the heat-treated thermoplastic polyurethane molding products are used as buffer ring B in the afore-mentioned rod sealing system, the heat-resistant durability against a loss of resilience can be increased, and thus the rod sealing system can have an improved durability against leakage due to the loss of resilience.

EXAMPLES

The present invention will be described in detail below.

Reference Example 400 g of polycarbonate-based polyol (Nippolan 980, a product of Nippon Polyurethane Co., Ltd. number average molecular weight Mn: about 2,000, OH value: 56.1) was melted at 110° C. and then dried under subatmospheric pressure at 110° C. for 45 minutes. Then, the polyol was charged into a reactor preheated to 120° C., and admixed with 211 g of tolidine diisocyanate (53 parts by weight per 100 parts by weight of the polycarbonate-based polyol, NCO/OH ratio: 1.10) with stirring, and subjected to reaction for 30 minutes to form a prepolymer. The prepolymer was admixed with 47 g of 1,4-butanediol (11.8 parts by weight per 100 parts by weight of the polycarbonate-based polyol) with stirring, and further stirred for 60 seconds. Then, the reaction mixture was poured onto a hot plate from the reactor and cured. The cured product was placed into an oven at 100° C. and left to stand for 15 hours, and cooled, whereby thermoplastic polyurethane was obtained.

The resulting thermoplastic polyurethane was pulverized and molded into a sheet-shaped molding product (150 mm×150 mm×2 mm) by an injection molding machine under such molding conditions as nozzle temperature: 230° C. and cylinder temperature: 180° C. The molded sheet was heat treated in an air circulation-type oven at 150° C. for 72 hours.

The thermoplastic polyurethane and the molded sheet were subjected to determination of the following test items:

Differential scanning calorimetry (DSC): 10-20 mg of a small sample piece was subjected to determination of Tg (glass transition point) and ΔH (enthalpy) values by a Perkin-Elmer DSC7 in a nitrogen gas atmosphere at a temperature elevation rate of 10° C./min Base line for calculating ΔH was a line connected between a contact point of high-temperature side base line with DSC curve, and a contact point of low-temperature side base line with DSC curve, and ΔH was calculated from a peak originated to a volume relaxation phenomena surrounded by intersections with DSC curve at glass transition point (Tg)

Moldability: Melt viscosity was determined by a Toyo Seiki Capillo-graph C1 under such conditions as temperature: 230° C. and shear rate: 121.6/sec., and at the same time injection moldability was evaluated as ○ for no observation of weldline, and Δ for observation of weldline Physical properties of molding product: Hardness, strength at breaking and elongation at breaking were determined according to ASTD D-412-83, and at the same time compression set value was determined under 25% compression at 80° C., 100° C., or 120° C. for 70 hours Abrasion resistance: static friction coefficient and dynamic friction coefficient were determined by a Suzuki type abrasion test in an Daphne hydraulic fluid #46 oil under such conditions as temperature: 100° C., peripheral speed: 667 mm/sec., and load: 294.2N Infrared spectrochemical analysis: NCO/C=C (aromatic) group ratio Comparative Reference Example 1

In Reference Example, no heat treatment was carried out.

Comparative Reference Example 2

In Reference Example, the heat treatment conditions was changed to 125° C. for 15 hours.

Comparative Reference Example 3

In Reference Example, the same amount of polycaprolactone-based polyol (Polylite OD-X-640, a product of Dainippon Ink and Chemicals; number average molecular weight Mn: about 2,000) was used in place of polycarbonate-based polyol, and 200 g of diphenylmethane diisocyanate (50 parts by weight per 100 parts by weight of polycaprolactone-based polyol, NCO/OH ratio: 1.10) as an isocyanate, and 104 g of 1,4-bis(β-hydroxyethoxy)benzene (25.9 parts by weight per 100 parts by weight of polycaprolactone-based polyol) as a chain elongation agent were used without the heat treatment.

Comparative Reference Example 4

In Reference Example, 96 g of p-phenylene diisocyanate (24 parts by weight per 100 parts by weight of polycarbonate-based polyol, NCO/OH ratio: 1.10) as a diisocyanate, and 68 g of 1,4-bis(β-hydroxyethoxy)benzene (17 parts by weight per 100 parts by weight of polycarbonate-based polyol) as a chain elongation agent were used, and the heat treatment conditions were changed to 125° C. for 15 hours.

Comparative Reference Example 5

In Comparative Reference Example 3, the heat treatment was carried out at 150° C. for 15 hours.

Comparative Reference Example 6

In Comparative Reference Example 5, the heat treatment conditions were changed to 150° C. for 72 hours.

Results of the foregoing Example and Comparative Reference Examples are shown in the following Table 1. DSC determination was impossible to conduct in Comparative Reference Examples 1 and 3, where no heat treatment was conducted.

TABLE 1

| Item of determination | Ref. Ex. | Comp. Ref. Ex. No. 1 | 2 | 3 | 4 | 5 | 6 |
|---|---|---|---|---|---|---|---|
| [DSC] | | | | | | | |
| Tg (° C.) | 207 | — | 173 | — | 185 | 188 | 192 |
| ΔH (J/g) | 7.1 | — | 3.9 | — | 3.6 | 15.9 | 17.4 |
| [Moldability] | | | | | | | |
| Melt viscosity (Pa · sec) | 234 | 234 | 234 | 57 | 4500 | 57 | 57 |
| Injection moldability | ○ | ○ | ○ | ○ | Δ | ○ | ○ |
| [Physical properties of molding products] | | | | | | | |
| Hardness (JIS-A) | A94 | A94 | A94 | A93 | A94 | A93 | A93 |
| Strength at breaking(Mpa) | 44.7 | 29.0 | 48.7 | 25.0 | 49.2 | 63.3 | 29.1 |
| Elongation at breaking (%) | 528 | 480 | 404 | 564 | 520 | 584 | 544 |
| Compression set | | | | | | | |
| 80° C. for 70 hours (%) | 40 | 70 | 39 | 73 | 26 | 31 | 41 |
| 100° C. for 70 hours (%) | 44 | 85 | 49 | 88 | 35 | 44 | 53 |
| 120° C. for 70 hours (%) | 67 | 96 | 92 | 98 | 69 | 82 | 83 |
| [Abrasion resistance] | | | | | | | |
| Static friction coefficient | 0.24 | 0.29 | 0.27 | 0.24 | 0.23 | 0.20 | 0.20 |
| Dynamic friction coefficient | 0.10 | 0.10 | 0.10 | 0.11 | 0.09 | 0.11 | 0.12 |
| [Infrared spectrochemical analysis] | | | | | | | |
| NCO/C = C ratio | 0.05 | 0.05 | 0.05 | 0.18 | 0.64 | 0.18 | 0.18 |

It is apparent from the results of Comparative Reference Examples that in Comparative Reference Examples 1 and 3 the behavior of glass transition point of hard phases is not satisfactory, so no good heat resistance and compression set characteristics are obtained, particularly the compression set at 120° C. is so large that any buffer rings capable of withstanding the service environmental temperature of 120° C. cannot be obtained, and, as apparent from Comparative Reference Example 2, even if Tg is above 170° C., no satisfactory characteristics are obtainable when the ΔH value is insufficient, and furthermore as apparent from Comparative Reference Example 4 even if the heat resistance and the compression set characteristics are improved by changing the copolymer composition, the melt viscosity is higher, resulting in poor moldability. In Comparative Reference Examples 5 and 6 (cases of using caprolactone-based polyol), even if Tg is above 170° C. and ΔH is above 5 J/g, the compression set at 120° C. is larger, so the object of the present invention to provide a buffer ring capable of withstanding high service environmental temperatures cannot be attained.

Example

Evaluation of Rate of Loss of Resilience of Buffer Ring

A rod sealing system, as shown in FIG. 1, was made up, using the heat-treated thermoplastic polyurethane molding product obtained in the afore-mentioned Reference Example, and subjected to a durability test under the following conditions to calculate a rate of loss of resilience as follows:

Rate of loss of resilience (%)=(interference before test−interference after test)/(interference before test)×100

(Durability Test Conditions)
Pressure: 42 MPa
Sliding speed: 400 mm/sec.
Sliding distance: 500 km and 120 km
Temperature: 110° C. and 120° C.

In rod sealing system 1 of the working embodiment as used in the afore-mentioned durability test, U-shaped packing 2 of buffer ring B was made of the heat-treated thermoplastic polyurethane molding product obtained in the afore-mentioned Reference Example; backup ring 6 of buffer ring B was made of polyamide (80NP, a product of NOK); U-shaped packing 8 of rod packing R was made of NBR (A505, a product of NOK); backup ring 11 of rod packing R was made of PTFE (19YF, a product of NOK); dust seal D was made of polyurethane (U801, a product of NOK); and SPCC(JIS) was used for the metal of metallic ring 15.

The results are shown in the following Table 2. Comparative Example is a case of replacing only buffer ring material in Example with polyurethane rubber of Comparative Reference Example 2, corresponding to thermoplastic urethane rubber (U641, a product of NOK) disclosed in Patent Literature 1, as a molding product. It is obvious from the results (rates of loss of resilience) that when the sliding distance and temperature are the same, the values of rate of loss of resilience will be smaller than those of Comparative Example, and particularly a difference in rate of loss of resilience therebetween will be larger at the elevated temperature (120° C.), and even in different sliding distances, i.e. 500 km and 120 km, the rate of loss of resilience at 110° C. of Comparative Example and that at 120° C. of Example are substantially equal to each other, so the heat-resistant durability of buffer ring B can be increased in the present invention.

TABLE 2

| | Sliding distance 500 km | | Sliding distance 120 km | |
|---|---|---|---|---|
| | 110° C. | 120° C. | 110° C. | 120° C. |
| Example | 50.6% | 67.1% | 42.1% | 51.7% |
| Comp. Ex. | 66.7% | 85.1% | 47.4% | 64.2% |

Evaluation of Leak Volume Rate:
Rod sealing system of Example was subjected to a JIS Class A sliding durability test (according to old JIS B 8354;

120° C., 500 km) to determine a relationship between sliding distance (km) and leak volume rate (cc/100 m sliding) on the basis of JIS Class A limit leak volume rate (0.04 cc) of the system. The results are graphically shown as Example in FIG. 2. Comparative Example shows results of determination in the case of rod sealing system of the afore-mentioned Comparative Example.

In the JIS Class A sliding durability test, a leak volume rate (oil leakage) serves as a factor in judging whether the sealing system is acceptable or not, and JIS sets forth an oil leak volume of oil hydraulic cylinder. For the size as used in the determination, 0.04 cc/100 m sliding can be regarded as a guide.

As given in FIG. 2 showing the relationship between the sliding distance and the leak volume rate, a sealing system with a distinguished sealability (less leak volume rate with good stability) can be obtained as used for a buffer ring. Particularly, a sealing system with a distinguished sealability in high temperature (120° C.) service can be obtained.

INDUSTRIAL UTILITY

The present heat-treated thermoplastic polyurethane molding product can be used not only as a sealing member in reciprocating motion, but also as a multi-sealing member in rotational motion, or in stationary state. Furthermore, the present polyurethane molding product can be applied to coupling parts of a boot with the driving shaft or retaining parts thereof at joints. The bellows part of a boot undergoes elongational deformation during the working, and the present polyurethane molding product having good heat resistance and compression set characteristics can be effectively applied to its coupling parts with a driving shaft or retaining parts thereof at joints.

The invention claimed is:

1. A rod sealing system, which comprises a buffer ring, a rod seal, and a dust seal, provided successively in this order from a hydraulic fluid side toward an outside in an annular clearance between two members that are in relative reciprocating motion to one another, the buffer ring comprising a thermoplastic polyurethane molding product obtained by subjecting a thermoplastic polyurethane molding product prepared by reaction of (A) a high molecular weight polycarbonatediol having a number average molecular weight Mn of 500-6,000, (B) an aromatic diisocyanate, and (C) a low molecular weight diol as a chain elongation agent in an NCO/OR ratio of 0.95-1.20 to heat treatment under conditions that a glass transition point (Tg) of hard phases becomes 170° C. or higher, and an endothermic peak area ($\Delta H$) at Tg becomes 5 J/g or more, by differential scanning calorimetry.

2. A rod sealing system according to claim 1, wherein the two members in relative reciprocating motion comprise a rod and a cylinder and the annular clearance between two members in relative reciprocating motion is an annular clearance formed between the a rod and the cylinder.

3. A rod sealing system according to claim 1, wherein the thermoplastic polyurethane molding product is heat-treated under conditions that the glass transition point Tg of hard phases is 170° C.-230° C.

4. A rod sealing system according to claim 1, wherein the thermoplastic polyurethane molding product is heat-treated at a temperature not lower than a glass transition point of soft phases and not higher than the glass transition point (Tg) of hard phases.

5. A rod sealing system according to claim 4, wherein the thermoplastic polyurethane molding product is heat-treated at 135° C.-170° C. for 10-100 hours.

\* \* \* \* \*